United States Patent
Bhandari et al.

(10) Patent No.: US 12,204,437 B1
(45) Date of Patent: Jan. 21, 2025

(54) TECHNIQUES FOR VISUALIZING BROWSER TEST METRICS

(71) Applicant: SPLUNK Inc., San Francisco, CA (US)

(72) Inventors: Aditya Bhandari, San Jose, CA (US); Khawar Deen, Sunnyvale, CA (US); William Matthew Hoffman, Atlanta, GA (US); Nicholas Owen Pierson, Phoenix, AZ (US); Seerut Sidhu, Santa Clara, CA (US); Harnit Singh, Union City, CA (US)

(73) Assignee: SPLUNK Inc., San Francisco, CA (US)

( * ) Notice: Subject to any disclaimer, the term of this patent is extended or adjusted under 35 U.S.C. 154(b) by 170 days.

(21) Appl. No.: 18/104,212

(22) Filed: Jan. 31, 2023

(51) Int. Cl.
  *G06F 9/44* (2018.01)
  *G06F 11/36* (2006.01)
(52) U.S. Cl.
  CPC ...... *G06F 11/3664* (2013.01); *G06F 11/3616* (2013.01)
(58) Field of Classification Search
  None
  See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,102,106 B2* | 10/2018 | Arguelles | G06F 11/3616 |
| 10,127,258 B2 | 11/2018 | Lamas et al. | |
| 2016/0103758 A1* | 4/2016 | Zhao | G06F 11/3684 717/124 |
| 2017/0046254 A1* | 2/2017 | Buege | G06F 11/3684 |
| 2019/0098106 A1 | 3/2019 | Mungel et al. | |
| 2020/0364133 A1* | 11/2020 | Vidal | G06F 11/3688 |
| 2021/0083961 A1* | 3/2021 | Polishchuk | H04L 43/08 |

(Continued)

OTHER PUBLICATIONS

Splunk Enterprise 8.0.0 Overview, available online, retrieved May 20, 2020 from docs.splunk.com.

(Continued)

*Primary Examiner* — Qamrun Nahar
(74) *Attorney, Agent, or Firm* — Kilpatrick Townsend & Stockton LLP

(57) ABSTRACT

Techniques, which may be embodied herein as systems, computing devices, methods, algorithms, software, code, computer readable media, or the like, are described herein for comparing a set of metrics generated during a simulated user interaction with a website to metrics generated by observing real user interactions with the website. Simulated user interactions with a website can be used to diagnose a website's performance issues, but it can be difficult to determine whether the simulated interactions reflect the experience of real users. In addition, the simulated user interactions can be challenging to contextualize because the number of observed real user interactions may significantly outnumber the simulated interactions. A graphical user interface can help with the interpretation of these website interactions by using the real user interactions to properly contextualize the simulated results.

20 Claims, 5 Drawing Sheets

(56) References Cited

U.S. PATENT DOCUMENTS

2022/0269579 A1* 8/2022 Hoenig ............... G06F 11/3612

OTHER PUBLICATIONS

Splunk Cloud 8.0.2004 User Manual, available online, retrieved May 20, 2020 from docs.splunk.com.
Splunk Quick Reference Guide, updated 2019, available online at https://www.splunk.com/pdfs/solution-guides/splunk-quick-reference-guide.pdf, retrieved May 20, 2020.
Carraso, David, "Exploring Splunk," published by CITO Research, New York, NY, Apr. 2012.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

* cited by examiner

TECHNIQUES FOR VISUALIZING BROWSER TEST METRICS

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Simulated user interactions with a website can be used to diagnose a website's performance issues, but it can be difficult to determine whether the simulated interactions reflect the experience of real users. In addition, the simulated user interactions can be challenging to contextualize because the number of observed real user interactions may significantly outnumber the simulated interactions. Accordingly, techniques for contextualizing simulated user interactions with a website are desirable.

BRIEF DESCRIPTION OF THE DRAWINGS

Illustrative examples are described in detail below with reference to the following figures.

DETAILED DESCRIPTION OF THE INVENTION

Figure 1:
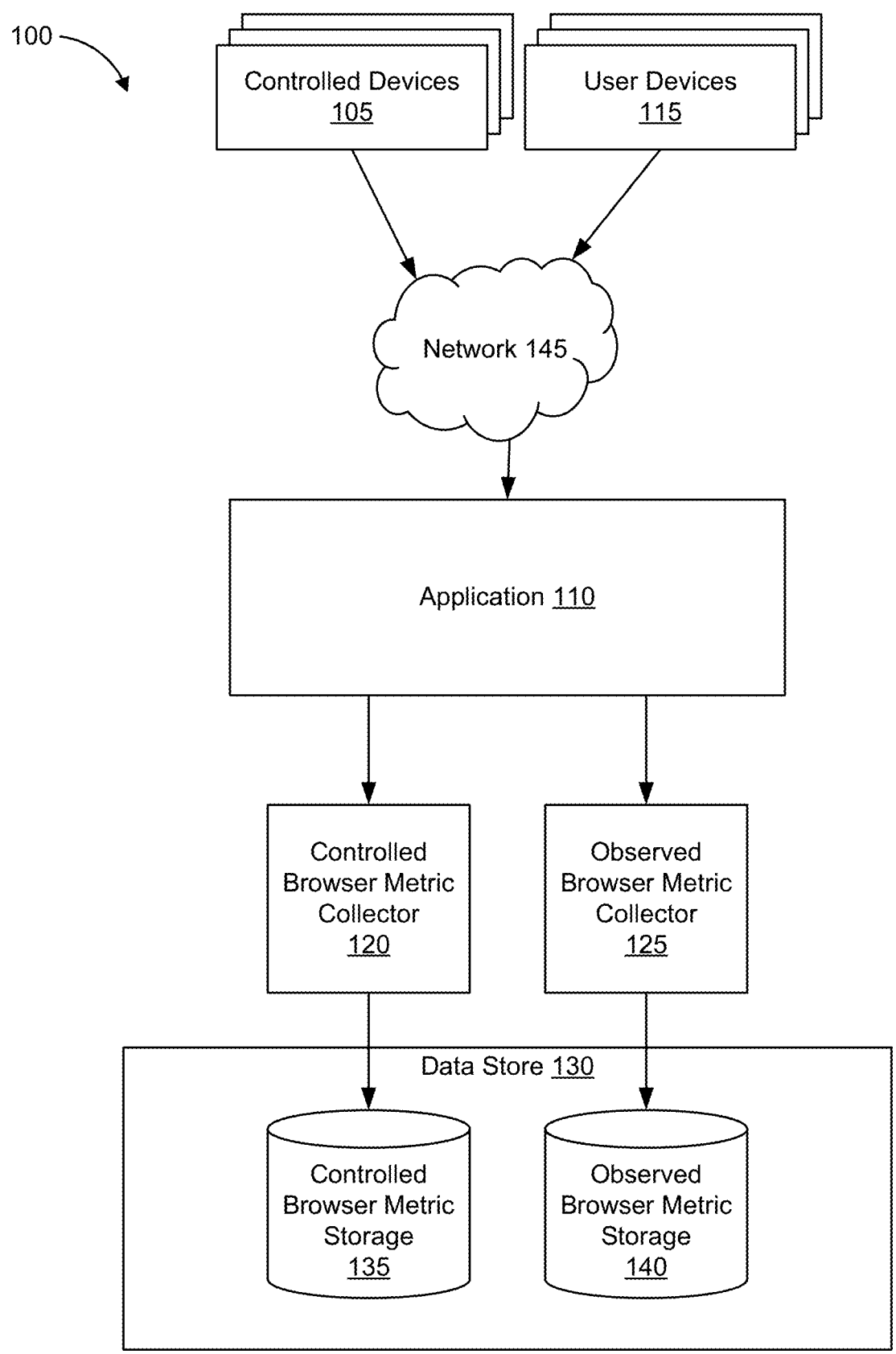
FIG. 1 shows an overview of an example environment for collecting and storing browser metrics data according to at least one embodiment.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Techniques, which may be embodied herein as systems, computing devices, methods, algorithms, software, code, computer readable media, or the like, are described herein for comparing a set of metrics generated during a simulated user interaction with a website to metrics generated by observing real user interactions with the website. Simulated user interactions with a website can be used to diagnose a website's performance issues, but it can be difficult to determine whether the simulated interactions reflect the experience of real users. In addition, the simulated user interactions can be challenging to contextualize because the number of observed real user interactions may significantly outnumber the simulated interactions. A graphical user interface can help with the interpretation of these website interactions by using the real user interactions to properly contextualize the simulated results.

In one general aspect, these techniques may include accessing a set of controlled test metrics for a controlled browser test of a particular uniform resource locator (URL). The set of controlled test metrics can have the particular uniform resource locator, a test time and one or more metrics calculated in response to a user request to perform a browser test of the particular uniform resource locator (URL) or in response to monitoring traffic between real users and the particular uniform resource locator. The one or more metrics including at least one of a largest contentful paint (LCP) time, a total blocking time (TBT), or a cumulative layout shift (CLS). The techniques may also include retrieving one or more sets of observed browser metrics using the particular uniform resource locator. Each set observed browser metrics of the one or more sets of observed browser metrics having an observed uniform resource locator, an observed time, and the one or more metrics. Each set of observed browser metrics was calculated with user traffic to a computing device hosting the particular uniform resource locator. Each of the one or more sets of observed browser metrics can have an observed time corresponding to a time period containing the test time. The techniques may furthermore include calculating, for each metric and using the plurality of observed browser metrics, a distribution and at least one percentile. The techniques may in addition include presenting, on a display device, a graphical user interface showing, for each metric, the set of controlled test metrics, the distribution, and the at least one percentile. Other embodiments of this aspect include corresponding computer implemented methods, computer systems, apparatus, and computer programs recorded on one or more computer storage devices, each configured to perform the actions of the methods.

Techniques, which may be embodied herein as systems, computing devices, methods, algorithms, software, code, computer readable media, or the like, are described herein for comparing a set of browser metrics generated during a simulated user interaction with a website to metrics generated by observing real user interactions with the website.

Simulated user interactions can be generated by a controlled computing device that mimics the characteristics of different types of user devices. A website provider (e.g., an individual or organization managing a website) may wish to check the performance of their site by generating performance metrics (e.g., controlled test metrics) on computing devices with various characteristics. The device's characteristics can include the device type, operating system, browser, screen resolution, device orientation, screen orientation, network connection (e.g., 3G, 4G, 5G, fiber optic, Digital Subscriber Line (DSL) etc.) or the geographic region where the device is physically located. The simulated interactions, generated as part of a controlled browser test, can be used to generate controlled test metrics that can be used to determine the root cause of the conditions experienced by real users accessing the website from their own devices.

For example, a website provider may receive reports that the site is experiencing suboptimal performance from New Mexico users accessing the website using Samsung Galaxy S22 devices over a 4G connection. However, the provider is uncertain whether the performance issues are being caused by network conditions in the region, the device, or the connection. To resolve this uncertainty, the provider can use a controlled computing device (e.g., a server) to determine the root cause of the problem. As part of a controlled browser test, the provider can provision a controlled computing device that emulates the devices' characteristics, and, by varying the characteristics and region, the provider can determine the cause of the suboptimal performance. In addition, the provider can use the controlled browser tests to create a set of tests that represent the geographical, hardware, and software profiles of the provider's customers to test the high-level availability and functionality of the provider's services and products. The controlled computing device can be physically located in the region and varying the conditions may include provisioning additional controlled computing devices that are physically located in one or more additional regions.

Unlike real user interactions with a website, the provider has control over the simulated interactions with the website. In addition, the provider has a complete picture of the conditions for a simulated interaction, because the provider provisioned the controlled device, and the provider may not have similarly detailed information for real user interactions. However, a limitation of the controlled test metrics is that it may be difficult to determine if the controlled test metrics are reflective of real user interactions with the website. This limitation can be addressed by using the observed metrics, generated by observing real user interactions with the website (e.g., real user monitoring metrics), to provide context for the controlled test metrics. The observed metrics can be used to calculate a distribution and percentiles for the observed metrics. These distributions and percentiles can be displayed alongside the controlled test metrics so that the user can understand how the controlled test metrics compare to real user interactions with the website.

The browser metrics, including the observed browser metrics and the controlled browser metrics, are intended to capture the real-world experience of a user interacting with a website. These metrics can be compared to benchmarks to determine if the performance on a given metric is good, poor, or needs improvement. These metrics can be calculated by performing controlled browser tests with a particular uniform resource locator or monitoring real user interactions with the uniform resource locator. Cumulative layout shift (CLS), one of the possible metrics, measures the stability of a webpage. Cumulative layout shift is based on a formula that tallies up how many times the components on the page move or "shift" around while the page is loading with fewer shifts being associated with better performance. Largest contentful paint (LCP) is another potential metric that is intended to measure website loading times as perceived by a user. Largest contentful paint measures time from a request to access the website until the largest content element in the viewport renders with shorter largest contentful paint times being associated with better performance. An additional potential metric, total blocking time (TBT), is intended to measure the website's responsiveness to user input. Total blocking time is the amount of time between the moment when the first content element is displayed in the viewport and the moment when the webpage is capable of responding to user input.

A potential issue with comparing controlled browser metrics generated by simulated user interactions and observed metrics from real user interactions is that there may be an imperfect match between the particular uniform resource locator used by the controlled device and the uniform resource locators used by real users. Searching a data store of real user interactions for the particular uniform resource locator may return too few results to calculate a proper distribution and it may be necessary to generalize (e.g., normalize) the particular uniform resource locator in order to locate a sufficient number of results.

For instance, a user may use uppercase letters in a uniform resource locator while the particular uniform locator is in lowercase letters. In another example, websites can store customization data in the uniform resource locator which can vary from user to user. A first user might be looking at "/product?view=gallery" while a second user, visiting the same page, is looking at "product?view=3d". There may not be a substantive difference between the two uniform resource locators but a search for the particular uniform resource locator may not return the user's results. Accordingly, the particular uniform resource locator may be normalized or transformed in a standardized manner so that the particular uniform resource locator becomes a set of equivalent uniform resource locators. A data store can be searched for this set of normalized uniform resource locators, and the size of the set of normalized resource locators can be increased or decreased based on the amount of observed metrics returned by the search. If the search returns too few results the number of normalized uniform resource locators can be increased, and, if the search returns too many results, the number of normalized resource locators can be decreased.

The techniques described herein can be used to compare controlled test metrics and observed metrics. In an illustrative example, a website provider uses a controlled computing device to perform a controlled browser test of a particular uniform resource locator. In this example, the controlled device is a server emulating a MacBook pro in Portugal on a 5G connection. After the test, the website provider receives, via a graphical user interface, controlled test metrics that include a cumulative layout shift of 0.05, a largest contentful shift of 1.5 seconds and a total blocking time of 5.0 milliseconds. The website provider compares these results to benchmarks for each metric and sees that the metrics are all in the "good" range, but the website provider is unsure if the results reflect the real experience of users in Portugal.

To provide context for the controlled browser test results, the website provider instructs a metric engine, via the graphical user interface, to search a data store of observed browser metrics that can be compared to the results. The search is performed for observed browser metrics that were generated in Portugal during a 30-minute window that immediately precedes the controlled browser test. In this case, the number of results is below a threshold and there are not enough results to calculate a distribution and percentiles (e.g., $50^{th}$ percentile, $75^{th}$ percentile, $90^{th}$ percentile, $95^{th}$ percentile, $99^{th}$ percentile).

Accordingly, the metrics engine normalizes the particular uniform resource locator and performs a second search of the data store. This second search returns enough results to calculate a distribution and percentile for each metric. These calculated distributions and percentiles are displayed, on the graphical user interface, and the website provider sees that the $50^{th}$ percentile for the observed browser metrics and the controlled test metrics are clustered together and the controlled test is reflective of the average Portuguese MacBook Pro accessing the particular uniform resource locator via a 5G connection during the 30-minute window.

FIG. 1 shows an overview of an example environment 100 for collecting and storing browser metrics according to at least one embodiment. As illustrated, environment 100 includes an application 110. The application 110 may be a website that is accessed from one or more controlled devices 105 or user devices 115 via a network 145. The application 110 may include software executing on one or more servers designed to provide one or more services over a network. For example, the application 110 can be a website, a web application, a web service, or the like provided via a server or cloud-computing environment. The application 110 may be a cloud-native application installed within one or more commercial cloud-infrastructures accessible over the Internet (e.g., network 145). Additionally, or alternatively, the application 110 may be installed on a dedicated server system accessible via one or more private network connections, such as an intranet (e.g., network 145).

The application 110 may be developed and deployed as a single unit or as multiple units using a microservices architecture. For example, the application 110 may include a collection of modules, services, and/or microservices. Each constituent module, or service, of the application 110 may be a small, flexible, and autonomous unit of software that connects to other services to make up a complete application. Additionally, or alternatively, each service may represent a collection of Application Programming Interface (API) endpoints and operations that work together with other services' endpoints in a distributed and dynamic architecture to deliver the full functionality of the application 110. As used herein, a "service" may encompass container services, microservices, and calls to serverless functions. For example, the application 110 may include a front-end service designed to facilitate interactions by end-users with the application 110 and one or more back-end services designed to respond to the user interactions by storing and retrieving data from one or more data stores.

Each controlled device 105 may be a computing device simulating an end user's experience or interaction with the application 110 over a period of time and is representative of the performance, general availability, and functionality of the application 110. For example, the controlled device 105 may simulate a user's interactions with a web-based application, such as a website, web application, or web service, over a period of time. These simulated interactions may represent actions a user conducts within a user interface, such as mouse clicks, taps on a touch screen, and keyboard events.

Each user device of the one or more user devices 115 may be one or more types of client devices. Client devices may include smartphones, tablets, laptop computers, desktop computers, e-readers, and the like. Client devices may initiate a session using one or more types of user agents, or applications, executing locally on the client device. For example, one or more web browsers may be executed by a smartphone, tablet, laptop, or desktop computer to access a website, web application, or web service provided by the application 110. As another example, a user agent component of the application 110 may be developed for execution by a specific type of client device (e.g., a native application) and configured to, upon execution by the client device, initiate a session with a server component of the application 110.

Each user device 115 may be a computing device that allows a user to interact with a web-based application, such as a website, web application, or web service, over a period of time. These interactions may include actions a user conducts within a user interface, such as mouse clicks, taps on a touch screen, and keyboard events. The user device 115 can be a computing device such as a personal computer, a server computer, a virtual machine, a bare metal machine, smartphones, tablets, laptop computers, desktop computers, e-readers, and the like.

Additionally, or alternatively, the controlled device 105 or the user device 115 may cause one or more transactions, or traces, handled by the application 110 and its constituent services. Transactions, or traces, may represent a set of events triggered as a result of a single logical operation. For example, a transaction, or trace, may initiate when a user selects a button via a user interface to start an action on a website. Each session may be made up of multiple interactions, traces, or transactions from an initial request to a final response. For example, in the context of an e-commerce website, a session may start when the application 110 receives a request from a user's web browser for a page from the website, include multiple interactions (e.g., requests to add items to a shopping cart), and end after a user has completed a purchase and/or navigated away from the website (e.g., by closing the browser or navigating to a different website).

Each controlled device of the one or more controlled devices 105 may simulate one or more types of user devices 115. User devices 115 may include smartphones, tablets, laptop computers, desktop computers, e-readers, and the like. User devices 115 may initiate a session using one or more types of user agents, or applications, executing locally on the user device. For example, one or more web browsers may be executed by a smartphone, tablet, laptop, or desktop computer to access a website, web application, or web service provided by the application 110. As another example, a user agent component of the application 110 may be developed for execution by a specific type of user device (e.g., a native application) and configured to, upon execution by the client device, initiate a session with a server component of the application 110.

The application 110 may include one or more User Interfaces (UIs), such as Graphical User Interfaces (GUIs), to facilitate interactions by a user with the application 110 during a session. For example, the application 110 may provide one or more GUIs in the form of a website including multiple webpages, or a web application, to a web browser or web view executing on a client device for rendering by the client device. Additionally, or alternatively, the application 110 may provide dynamic content based on one or more GUI templates defined for a client component of the application 110 to be rendered by a client device upon execution of the client component by the client device.

As further illustrated, environment 100 includes a controlled browser test metric collector 120 and observed browser metric collector 125. The controlled browser test metric collector 120 may include one or more services or software components separate from the application 110 executing within the same computing environment as the application 110 or in a separate computing environment connected via one or more network connections to the application 110. The controlled browser test metric collector 120 may be configured to measure or receive one or more controlled browser metrics data from the application 110 or the controlled devices 105, and their associated information as described above, generated by the application 110, process the controlled browser metrics data, and export the controlled browser metrics for storage in the controlled browser test metric storage 135.

The controlled browser test metric collector 120 may receive controlled browser test metrics generated by the application 110, or controlled devices 105, via a push or a pull functionality implemented by the application 110 or controlled device 105. For example, the application 110, or controlled devices 105 may be implemented to push controlled browser metrics to the controlled browser test metric collector 120 as they are generated and/or after a predefined number of controlled browser metrics have been captured by the application 110 or the controlled devices 105. As another example, the application 110, or the controlled devices 105, may be implemented to provide spans generated by the application 110, or the controlled devices 105, in response to requests from the controlled browser test metric collector 120.

The observed browser metric collector 120 may further be configured to process raw data, or browser metrics, collected from the application 110, or the user devices 115, prior to export and/or storage. For example, the observed browser metric collector 120 may modify one or more attributes or pieces of information comprising an observed browser test metric, a span, place spans, metrics, and logs into batches, filter spans based on one or more metrics, apply one or more tags to the spans, and the like. After processing the observed browser metrics, the observed browser metric collector 120 may export the observed browser metrics for storage in the observed browser metric storage 140. Spans may be exported as a file, such as a JSON file, via a console or terminal, and the like. The observed browser metric collector 120 may be implemented using one or more versions or distributions of OpenTelemetry or other similar observability frameworks.

The observed browser metric collector 125 may receive observed browser data generated by the application 110, or user devices 115, via a push or a pull functionality implemented by the application 110 or user devices 115. For example, the application 110, or user devices 115 may be implemented to push observed browser metrics to the observed browser metric collector 125 as they are generated and/or after a predefined number of observed browser metrics have been captured by the application 110 or the user devices 115. As another example, the application 110, or the user devices 115, may be implemented to provide spans generated by the application 110, or the user devices 115, in response to requests from the observed browser metric collector 125.

The observed browser metric collector 125 may further be configured to process raw data, or browser metrics data, collected from the application 110, or the user devices 115, prior to export and/or storage. For example, the observed browser metric collector 125 may modify one or more attributes or pieces of information comprising an observed browser test metric, a span, place spans, metrics, and logs into batches, filter spans based on one or more metrics, apply one or more tags to the spans, and the like. After processing the observed browser metrics, the observed browser metric collector 125 may export the observed browser metrics for storage in the observed browser metric storage 140. Spans may be exported as a file, such as a JSON file, via a console or terminal, and the like. The observed browser metric collector 125 may be implemented using one or more versions or distributions of OpenTelemetry or other similar observability frameworks.

As described further herein, the data store 130 comprising the controlled browser test metric storage 135 and the observed browser metric storage 140 may store test metric fields common to both controlled browser metrics and observed browser metrics. For example, spans and replay data may be stored in association with a "uniform resource locator" field identifying the particular uniform resource locator from which the browser metrics were generated by the application 110. As another example, the spans and replay data may be stored in association with a "timestamp" field identifying the time at which the span or replay data was generated by the application 110. In yet another example, the spans and replay data may be stored in association with an "application" field distinguishing the application 110 from other applications. Additionally, or alternatively, spans and replay data may be stored in associated with a "page redirection ID" field associating a page redirection or opening of a new tab by a user.

Figure 2:
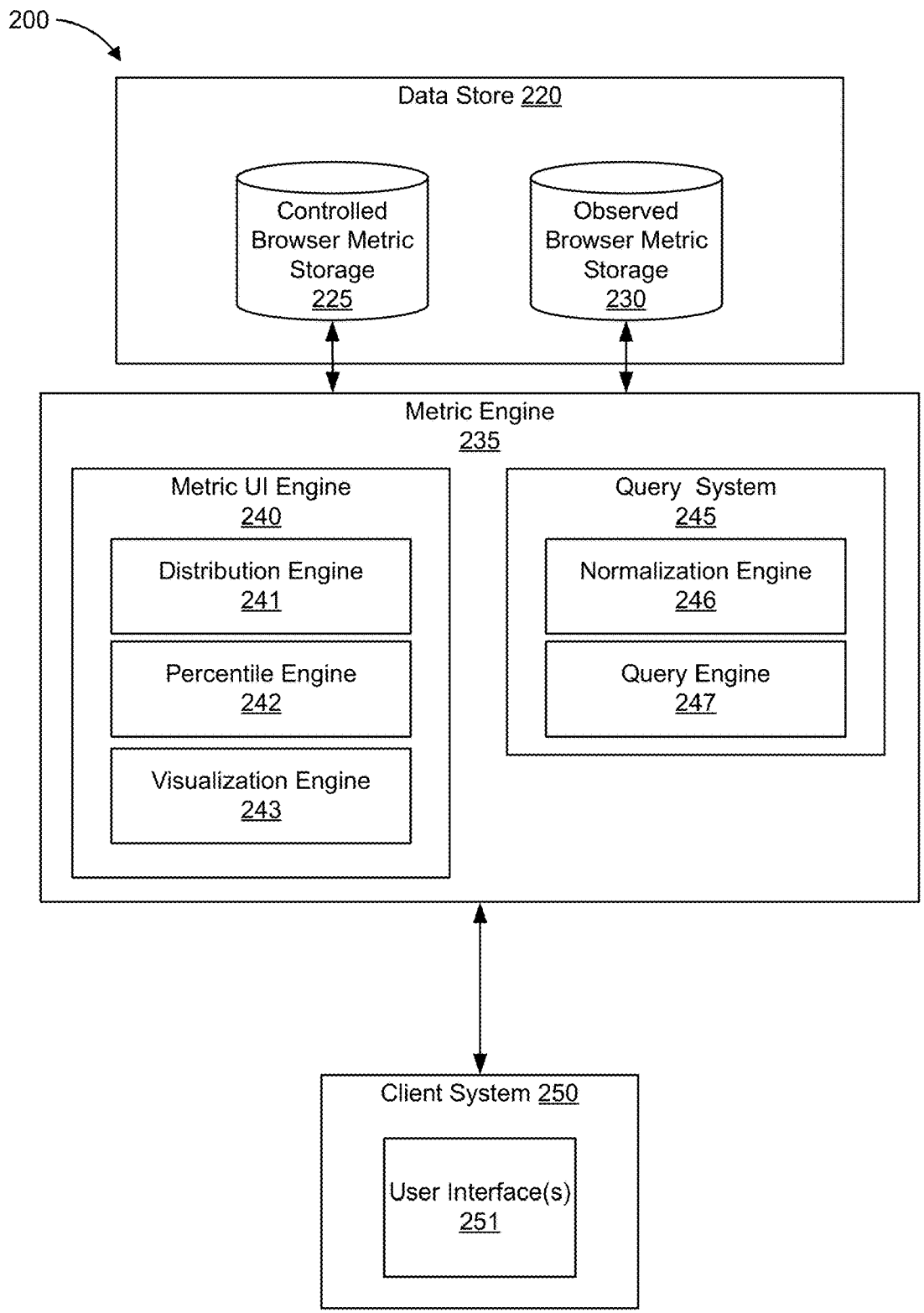
FIG. 2 shows an overview of an example environment for processing and presenting browser metrics data according to at least one embodiment.

FIG. 2 shows an overview of an example environment 200 for processing and presenting browser metrics according to at least one embodiment. As illustrated, environment 200 includes a data store 220 with a controlled browser test metric storage 225 and an observed browser metric storage 230. The data store 220, controlled browser test metric storage 225, and the observed browser metric storage 230 can be similar to the data store 130, the controlled browser test metric storage 135 and the observed browser metric storage 140 described above with respect to FIG. 1.

As further illustrated, environment 200 includes a metric engine 235 and client system 250. The metric engine 235 may include one or more applications or software services configured to process, analyze, and present browser metrics in such a way that users of the client system 250 may identify and investigate errors affecting the end user experience provided by the application, as described further herein. The metric engine 235 may receive browser test metric data from the controlled browser test metric storage 225 and/or the observed browser metric storage 230 in response to requests from a user of the client system 250 to analyze the quality of service provided to users by the application. In response to requests from a user of the client system 250, the metric engine 235 may query for data relevant to the user's request from the controlled browser test metric storage 225 and/or observed browser metric storage 230. For example, in response to a request for more information about user activity, the metric engine 235 may query for browser metrics data stored in the controlled browser test metric storage 225 and the observed browser metric storage 230 associated with the user session. Such a request, and the associated query, may include a unique SessionID associated with the user session.

As further illustrated, the metric engine 235 includes a metric UI engine 240 and a query system 245. As described further herein, the metric UI engine 240 may include one or more modules or services designed to analyze and present browser metrics, such as controlled browser test metric and/or observed browser metrics and the information they comprise, generated by the application 110. Likewise, the query system 245 may include one or more modules or services designed to analyze and present replay data generated by the application 110. Combined, the metric UI engine 240 and the query system 245 may provide functionality to the client system 250 to visualize, and interact with, session data.

Metric user interface (UI) engine 240 can process the browser metrics received from the data store 220 in response to a query generated by the query system 245. Normalization engine 246 in query system 245 can normalize a uniform resource locator provided by a web provider via the user interface(s) 251 of the client system 250. The normalization engine 246 can transform the provided uniform resource locator into a plurality of normalized uniform resource locators using one or more standard URL normalization techniques such as converting percent-encoded triplets to uppercase, converting the scheme and host to lowercase, decoding percent-encoded triplets of unreserved characters, removing dot-segments, converting an empty path to a "/" path, removing the default port, adding a trailing "/" to a non-empty path, removing directory index, removing the fragment component of a URL, replacing IP with domain name, limiting protocols, removing duplicate slashes, removing or adding "www" as the first domain label, sorting the query parameters, removing unused query variables, removing default query parameters, or removing the "?" when the query is empty. In addition, portions of the uniform resource locator can be abstracted (e.g., sections of the path or specific query parameters). Abstraction can be performed using abstraction methods such as wildcard pattern matching. Abstracted sections of a uniform resource locator could include identifiers (e.g., a unique identifier). These techniques can include techniques that preserve the semantics of the uniform resource locator or techniques that change the semantics of the uniform resource locator.

The normalization engine 246 can provide the plurality of normalized uniform resource locators to the query engine 247 which can search the data store 220 for any browser metrics that were generated using a uniform resource locator that matches a uniform resource locator in the plurality of normalized uniform resource locators. In some embodiments, the query engine 247 can search the data store with the provided uniform resource locator without any normalization.

Upon or after the browser metrics are retrieved by the query system 245, the metric UI engine 240 can process the retrieved browser metrics for display by the user interface(s) 251. The distribution engine 241 can calculate a distribution (e.g., a normal distribution, bell curve, range, and the like) of the retrieved browser metrics (e.g., the controlled browser metrics and the observed browser metrics). In some embodiments, the distribution can be generated from the controlled browser metrics, the observed browser metrics, or both. The distribution may include all of the metrics data or the outliers may be removed or the distribution can be otherwise processed by the distribution engine 241. Similarly, the percentile engine 242 can calculate one or more percentiles using the distribution generated by the distribution engine 241. The percentiles can include a $1^{st}$ percentile, a $5^{th}$ percentile, a $10^{th}$ percentile, a $20^{th}$ percentile, a $25^{th}$ percentile, a $50^{th}$ percentile, a $75^{th}$ percentile, an $80^{th}$ percentile, a $90^{th}$ percentile, a $95^{th}$ percentile, a $99^{th}$ percentile, a $99.9^{th}$ percentile. In addition, the percentile engine can generate an interquartile range, a mean, a median, a mode, a standard deviation, a minimum, a maximum. The percentile engine 242 may combine, process, or transform the percentiles in response to user input from the user interface(s) 251.

The visualization engine 243 can create a graphical display using one or more of the data generated by the distribution engine, the data generated by the percentile engine 242, or the browser metrics received at the metric UI engine 240 from the store 220. The graphical display can be the graphical display described below in relation to FIGS. 3A-3C. The graphical display can be presented on a display device in client system 250 as part of the user interface(s) 251.

Figure 3A:
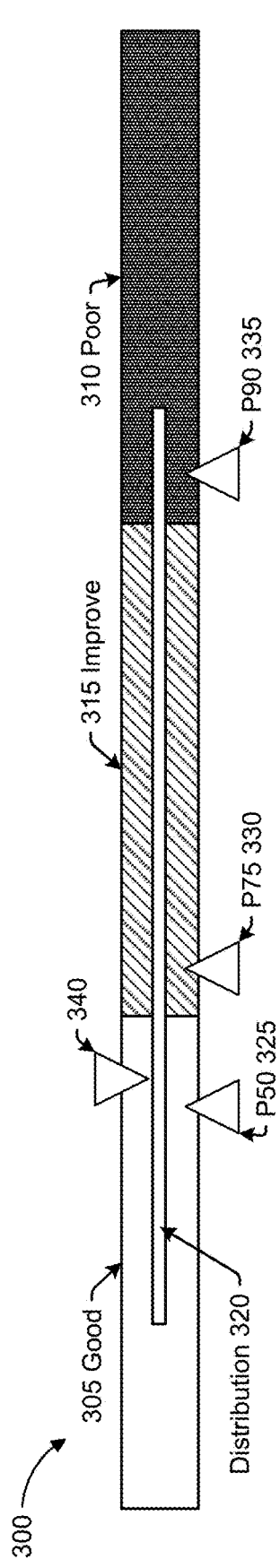
FIGS. 3A-3C show simplified diagrams of a graphical display for visualizing browser metrics data according to at least one embodiment.
Figure 3B:
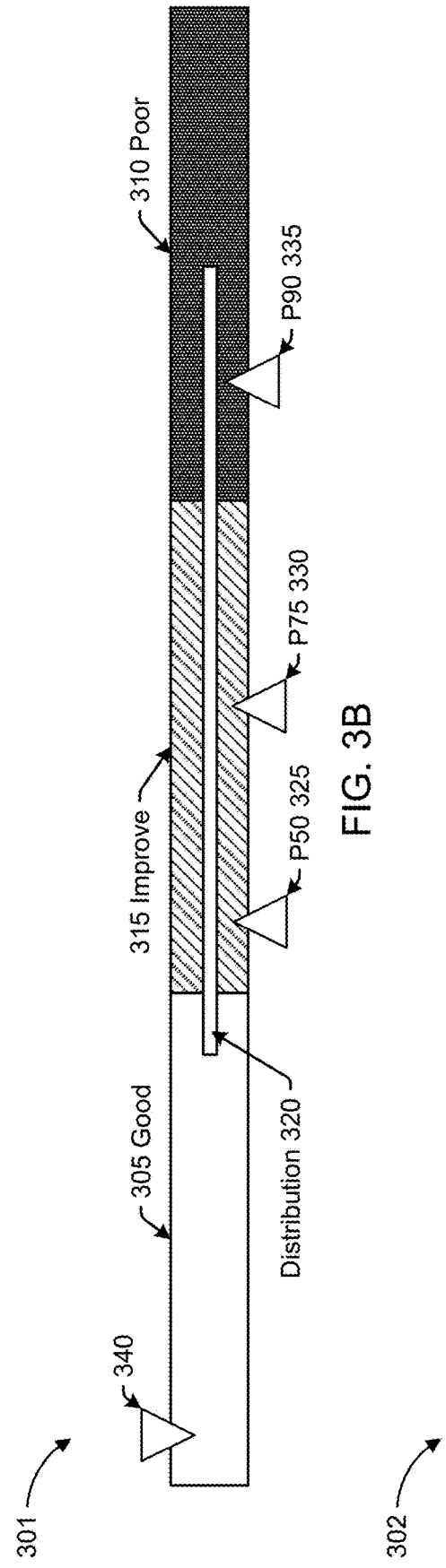
Figure 3C:
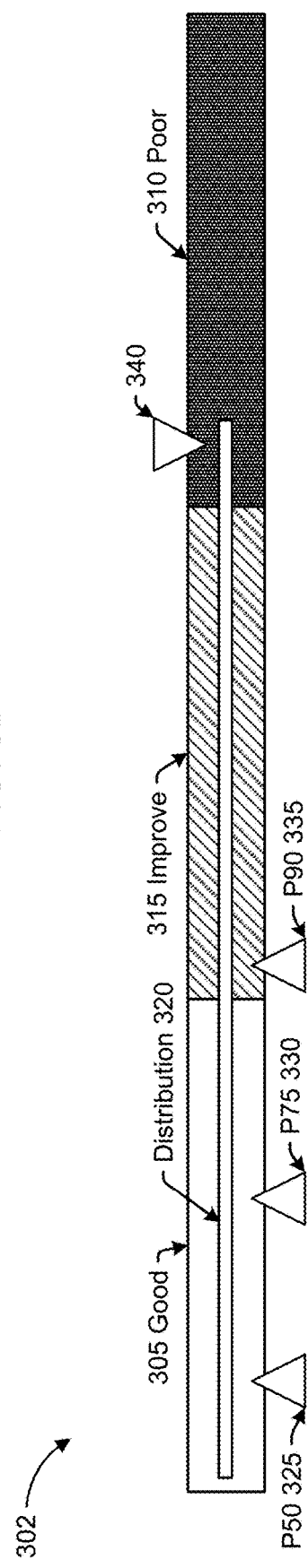

FIGS. 3A-3C show simplified diagrams 300-302 of a graphical display for visualizing browser metrics data according to at least one embodiment. The graphical displays shown in diagrams 300-302 can be used to compare controlled browser metrics data against observed browser metrics so that a website provider can determine whether the controlled browser test is generating metrics that reflect the real experience of users visiting a particular uniform resource locator. In some embodiments, a graphical display can be prepared for one or more of the metric types (e.g., cumulative layout shift (CLS), largest contentful paint (LCP), total blocking time (TBT)). The displays are divided into three sections representing ranges of browser metrics that are good section 305, poor section 310, or needs improvement section 315. The sections are calculated using benchmarks generated either by the website provider or an outside organization. The three sections can be color coded or labeled to help the website provider intuitively understand the meaning of each range. The sections can correspond to different contiguous ranges of browser test metric values and these ranges can be equal size or the size of the ranges can vary between sections (e.g., 0.00-1.00 seconds for "good" 1.01-7.00 seconds for "needs improvement" and 7.01-100.00 for "poor"). However, the displays may show the three sections as equal width to help the web provider visualize the browser metrics.

The graphical displays can include a distribution 320 representing a distribution of browser metrics such as the distribution calculated by the distribution engine 241. Triangles on the bottom edge of the display with a point facing up can be used to visually display different ranges with P50 325 representing the $50^{th}$ percentile, P75 330 representing the $75^{th}$ percentile, and P90 335 representing the $90^{th}$ percentile. A controlled browser test metric 340, shown as a downward facing triangle on the top edge of the display, represents the results of a controlled browser test or an average of the results of two or more controlled browser tests.

Turning now to diagram 300 in greater detail, a website provider, looking at the controlled browser test metric 340, can see that the controlled browser test produced results in the good section 305. However, the website provider may not understand how this result compares to the experience of real users. The provider can see that the controlled browser test metric 340 is within the distribution 320 and between P50 325 and P75 330. Accordingly, the website provider can quickly and visually understand that this good result represents a result in the third quartile of the results experienced by real users and therefore is likely reflective of the average user's experience.

Turning now to diagram 301 in greater detail, a website provider, looking at the controlled browser test metric 340, can see that the controlled browser test produced results in the good section 305. However, in this case, the provider can see that the controlled browser test metric 340 is outside of the distribution 320 and the controlled browser metric is not near any of the percentiles. Accordingly, the website provider can quickly and visually understand that this good result is not reflective of the average user's experience.

Turning now to diagram 302 in greater detail, a website provider, looking at the controlled browser test metric 340, can see that the controlled browser test produced results in the poor section 310. However, in this case, the provider can see that the controlled browser test metric 340 is within the distribution 320 and the controlled browser metric is not near any of the percentiles. Accordingly, the website provider can quickly and visually understand that this poor result may not be reflective of the average user's experience, but it is worth additional investigation because it is reflective of some user's experiences.

Figure 4:
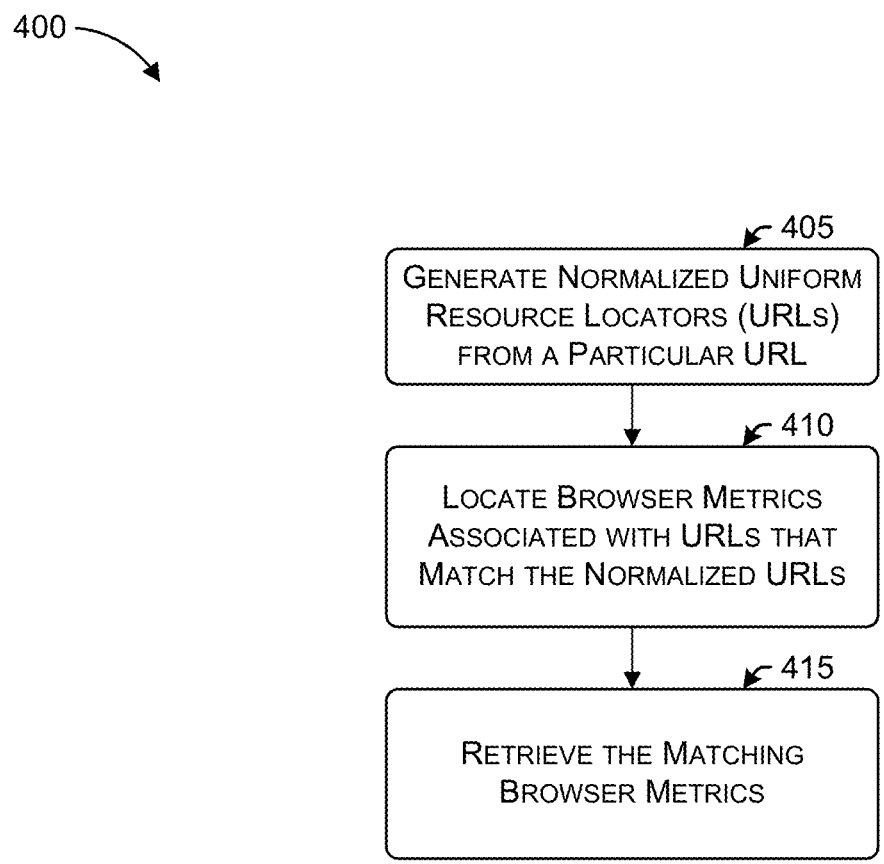
FIG. 4 is a simplified diagram of a technique for retrieving browser metrics data from a data store according to at least one embodiment.

FIG. 4 is a simplified diagram of a technique 400 for retrieving browser metrics from a data store according to at least one embodiment. This technique is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the techniques.

Turning to technique 400 in greater detail, at block 405, normalized uniform resource locators can be generated from a particular uniform resource locator. The particular uniform resource locator can be a locator associated with an application such as application 110, and a controlled device, such as controlled device 105, can use the particular uniform resource locator to perform a controlled browser test. The normalized uniform resource locators can be a plurality of normalized resource locators generated by a normalization engine such as normalization engine 246. The normalization engine 246 can transform the particular uniform resource locator into a plurality of normalized uniform resource locators using one or more standard URL normalization techniques such as converting percent-encoded triplets to uppercase, converting the scheme and host to lowercase, decoding percent-encoded triplets of unreserved characters, removing dot-segments, converting an empty path to a "/" path, removing the default port, adding a trailing "/" to a non-empty path, removing directory index, removing the fragment component of a URL, replacing IP with domain name, limiting protocols, removing duplicate slashes, removing or adding "www" as the first domain label, sorting the query parameters, removing unused query variables, removing default query parameters, or removing the "?" when the query is empty. These techniques can include techniques that preserve the semantics of the uniform resource locator or techniques that change the semantics of the uniform resource locator.

At block 410, browser metrics with uniform resource locators that match the normalized uniform resource locators can be located. A query system or query engine (e.g., query system 245 or query engine 247) can locate the browser metrics in a data sore such as data store 220, controlled browser test metric storage 225, or observed browser metric storage 230. The number of located browser metrics can be compared to a threshold, and, if the number of metrics is below the threshold, additional normalized uniform resource locators may be generated according to the techniques described above in relation to block 410.

At block 415, the matching browser metrics can be retrieved. The matching browser metrics can be retrieved by a metric engine (e.g., metric engine 235) from the data store from 410. The retrieved browser metrics can be processed by one or more components of a metric UI engine such as metric UI engine 240.

Figure 5:
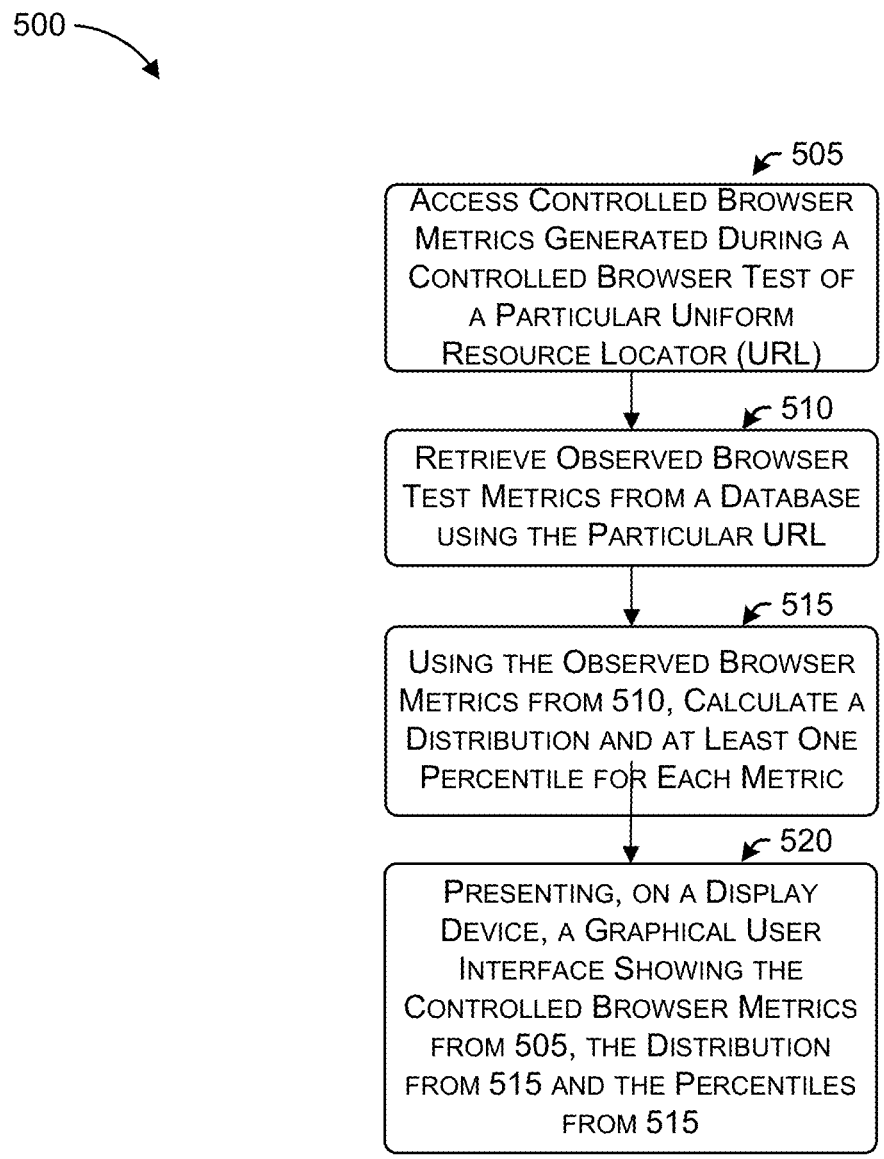
FIG. 5 shows a flowchart of a method for processing and displaying browser metrics data according to at least one embodiment.

FIG. 5 shows a flowchart of a method 500 for processing and displaying browser metrics according to at least one embodiment. This method is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the method.

Turning to method 500 in greater detail, at block 505, controlled test metrics can be accessed. The controlled test metrics can be generated during a controlled browser test of a particular uniform resource locator. The controlled test metrics can comprise a particular uniform resource locator, a test time and one or more metrics. The one or more metrics that can be calculated by performing a controlled browser test or by monitoring real user traffic to the uniform resource locator (e.g., cumulative layout shift (CLS), largest contentful paint (LCP), total blocking time (TBT)). As discussed above, the metrics can be calculated in response to a request to perform a controlled browser test of the particular uniform resource locator, and the request can be generated by a client system such as client system 250. A controlled device (e.g., controlled devices 105) can be used to perform the controlled browser test. The controlled test metrics can be accessed from a controlled browser test metric storage such as controlled browser test metric storage 225.

At block 510, observed metrics can be retrieved from a database using the particular uniform resource locator from 505. The particular uniform resource locator may be normalized according to the techniques described herein including technique 400 described above. The database can be a data store such as data store 220 and the observed metrics can be retrieved by a query engine such as query engine 247. The observed metrics can comprise an observed uniform resource locator (e.g., corresponding to a normalized uniform resource locator), one or more metrics (e.g., cumulative layout shift (CLS), largest contentful paint (LCP), total blocking time (TBT)), and an observed time (e.g., the time when the user device interacted with the observed uniform resource locator). Each of the observed browser metrics can have an observed time that corresponds to a time period that contains the test time from 505. The time period can be a range of time before, after, or before and after the test time from 505. The time period can be one minute, two minutes, three minutes, for minutes, 5 minutes, 10 minutes, 20 minutes, 30 minutes, 45 minutes, 1 hour, 2 hours, 6 hours, 12 hours, 1 day, 1 week, and the like. Each set of each set of observed browser metrics can be generated using user traffic from user devices (e.g., user devices 115) located in a geographic region (e.g., city, state, province, region, country, continent, etc.) and the test computing device (e.g., controlled devices 105) is located in the same geographic region.

At block 515, a distribution and at least one percentile can be calculated for each metric using the observed metrics from 510. Each metric can include one or more of: cumulative layout shift (CLS), largest contentful paint (LCP), total blocking time (TBT). The percentile and distributions can be calculated by components of a metric UI engine such as metric UI engine 240.

At block 520, a graphical user interface can be presented on a display device. The graphical user interface can display one or more of the controlled metrics from 505, the distribution from 515, or the percentiles from 515. The percentiles can include one or more percentiles using the distribution generated by the distribution engine 241. The percentiles can include a $1^{st}$ percentile, a $5^{th}$ percentile, a $10^{th}$ percentile, a $20^{th}$ percentile, a $25^{th}$ percentile, a 50th percentile, a $75^{th}$ percentile, an $80^{th}$ percentile, a $90^{th}$ percentile, a $99^{th}$ percentile. In addition, the percentiles can include an interquartile range, a mean, a median, a mode, a standard deviation, a minimum, a maximum. The graphical user interface can be the graphical display shown in diagrams 300-301 with one graphical display generated by the visualization engine 243 for each metric from 515. The display device can be a display device of a client system such as client system 250.

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer implemented method comprising:
   accessing a set of controlled test metrics for a controlled browser test of a particular uniform resource locator (URL), the set of controlled test metrics comprising the particular uniform resource locator, a test time and one or more metrics calculated in response to a request to perform a browser test of the particular uniform resource locator (URL);
   retrieving, from a data store, one or more sets of observed browser metrics using the particular uniform resource locator, each set of observed browser metrics of the one or more sets of observed browser metrics comprising an observed uniform resource locator, an observed time and the one or more metrics, where each set of observed browser metrics was calculated using user traffic to a host computing device hosting the particular uniform resource locator, each set of observed browser metrics having an observed time corresponding to a time period containing the test time;
   calculating, for each metric of the one or more metrics and using the one or more sets of observed browser metrics, a distribution and at least one percentile; and
   presenting, on a display device, a graphical user interface showing, for each metric, the set of controlled test metric, the distribution, and the at least one percentile.

2. The method of claim 1, wherein retrieving the one or more sets of observed browser metrics further comprises:
   transforming the particular uniform resource locator into a first plurality of normalized uniform resource locators;
   locating, in the data store, a first plurality of sets of matching browser metrics with observed uniform resource locators that match the plurality of normalized uniform resource locators; and
   retrieving the first plurality of sets of matching browser metrics as the one or more sets of observed browser metrics.

3. The method of claim 2, further comprising:
   comparing the first plurality of sets of matching browser metrics to a threshold;
   responsive to a determination that the first plurality of sets of matching browser metrics is below the threshold, calculating a second plurality of normalized uniform resources locators;
   locating, in the data store, a second plurality sets of matching browser metrics with observed uniform resource locators that match the second plurality of normalized uniform resource locators; and
   retrieving the second plurality of sets of matching browser metrics as the one or more sets of observed browser metrics.

4. The method of claim 3, wherein the second plurality of normalized uniform resource locators is larger than the first plurality of normalized resource locators.

5. The method of claim 1, wherein the controlled browser test comprises simulated user interactions between a test computing device, generating the simulated user interactions, and the host computing device hosting the particular uniform resource locator.

6. The method of claim 5, wherein each set of each set of observed browser metrics of the one or more sets of observed browser metrics was generated using user traffic from a geographic region.

7. The method of claim 6, wherein the test computing device is located in the geographic region.

8. A computing device, comprising:
   a processor; and a non-transitory computer-readable medium having stored thereon instructions that, when executed by the processor, cause the processor to perform operations comprising:
accessing a set of controlled test metrics for a controlled browser test of a particular uniform resource locator (URL), the set of controlled test metrics comprising the particular uniform resource locator, a test time and one or more metrics calculated in response to a request to perform a browser test of the particular uniform resource locator (URL)
retrieving, from a data store, one or more sets of observed browser metrics using the particular uniform resource locator, each set of observed browser metrics of the one or more sets of observed browser metrics comprising an observed uniform resource locator, an observed time and the one or more metrics, where each set of observed browser metrics was calculated using user traffic to a host computing device hosting the particular uniform resource locator, each set of observed browser metrics having an observed time corresponding to a time period containing the test time;
calculating, for each metric of the one or more metrics and using the one or more sets of observed browser metrics, a distribution and at least one percentile; and
presenting, on a display device, a graphical user interface showing, for each metric, the set of controlled test metric, the distribution, and the at least one percentile.

9. The computing device of claim 8, wherein the operations further comprise:
transforming the particular uniform resource locator into a first plurality of normalized uniform resource locators;
locating, in the data store, a first plurality of sets of matching browser metrics with observed uniform resource locators that match the plurality of normalized uniform resource locators; and
retrieving the first plurality of sets of matching browser metrics as the one or more sets of observed browser metrics.

10. The computing device of claim 9, wherein the operations further comprise:
comparing the first plurality of sets of matching browser metrics to a threshold;
responsive to a determination that the first plurality of sets of matching browser metrics is below the threshold, calculating a second plurality of normalized uniform resources locators;
locating, in the data store, a second plurality sets of matching browser metrics with observed uniform resource locators that match the second plurality of normalized uniform resource locators; and
retrieving the second plurality of sets of matching browser metrics as the one or more sets of observed browser metrics.

11. The computing device of claim 10, wherein the second plurality of normalized uniform resource locators is larger than the first plurality of normalized resource locators.

12. The computing device of claim 8, wherein the controlled browser test comprises simulated user interactions between a test computing device, generating the simulated user interactions, and the host computing device hosting the particular uniform resource locator.

13. The computing device of claim 12, wherein each set of each set of observed browser metrics of the one or more sets of observed browser metrics was generated using user traffic from a geographic region.

14. The computing device of claim 13, wherein the test computing device is located in the geographic region.

15. A non-transitory computer-readable medium comprising instructions that, when executed by one or more processors, cause the one or more processors to perform operations comprising:
accessing a set of controlled test metrics for a controlled browser test of a particular uniform resource locator (URL), the set of controlled test metrics comprising the particular uniform resource locator, a test time and one or more metrics calculated in response to a request to perform a browser test of the particular uniform resource locator (URL);
retrieving, from a data store, one or more sets of observed browser metrics using the particular uniform resource locator, each set of observed browser metrics of the one or more sets of observed browser metrics comprising an observed uniform resource locator, an observed time and the one or more metrics, where each set of observed browser metrics was calculated using user traffic to a host computing device hosting the particular uniform resource locator, each set of observed browser metrics having an observed time corresponding to a time period containing the test time;
calculating, for each metric of the one or more metrics and using the one or more sets of observed browser metrics, a distribution and at least one percentile; and
presenting, on a display device, a graphical user interface showing, for each metric, the set of controlled test metric, the distribution, and the at least one percentile.

16. The non-transitory computer readable medium of claim 15, wherein the operations further comprise:
transforming the particular uniform resource locator into a first plurality of normalized uniform resource locators;
locating, in the data store, a first plurality of sets of matching browser metrics with observed uniform resource locators that match the plurality of normalized uniform resource locators; and
retrieving the first plurality of sets of matching browser metrics as the one or more sets of observed browser metrics.

17. The non-transitory computer readable medium of claim 16, wherein the operations further comprise:
comparing the first plurality of sets of matching browser metrics to a threshold;
responsive to a determination that the first plurality of sets of matching browser metrics is below the threshold, calculating a second plurality of normalized uniform resources locators;
locating, in the data store, a second plurality sets of matching browser metrics with observed uniform resource locators that match the second plurality of normalized uniform resource locators; and
retrieving the second plurality of sets of matching browser metrics as the one or more sets of observed browser metrics.

18. The non-transitory computing medium of claim 17, wherein the second plurality of normalized uniform resource locators is larger than the first plurality of normalized resource locators.

19. The non-transitory computing medium of claim 15, wherein the controlled browser test comprises simulated user interactions between a test computing device, generating the simulated user interactions, and the host computing device hosting the particular uniform resource locator.

20. The non-transitory computing medium of claim 19, wherein each set of each set of observed browser metrics of the one or more sets of observed browser metrics was generated using user traffic from a geographic region.

* * * * *